Patented Feb. 7, 1933

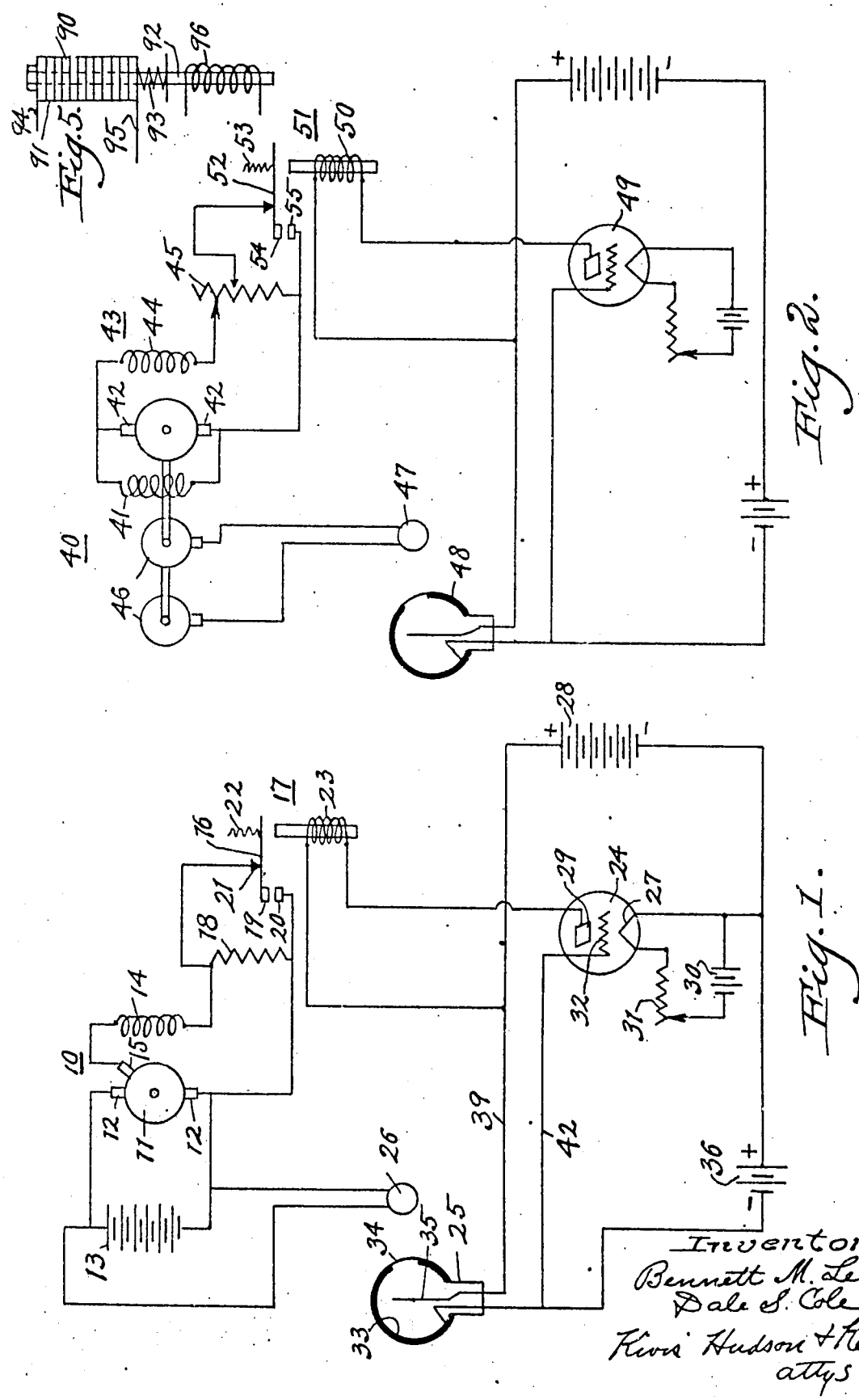

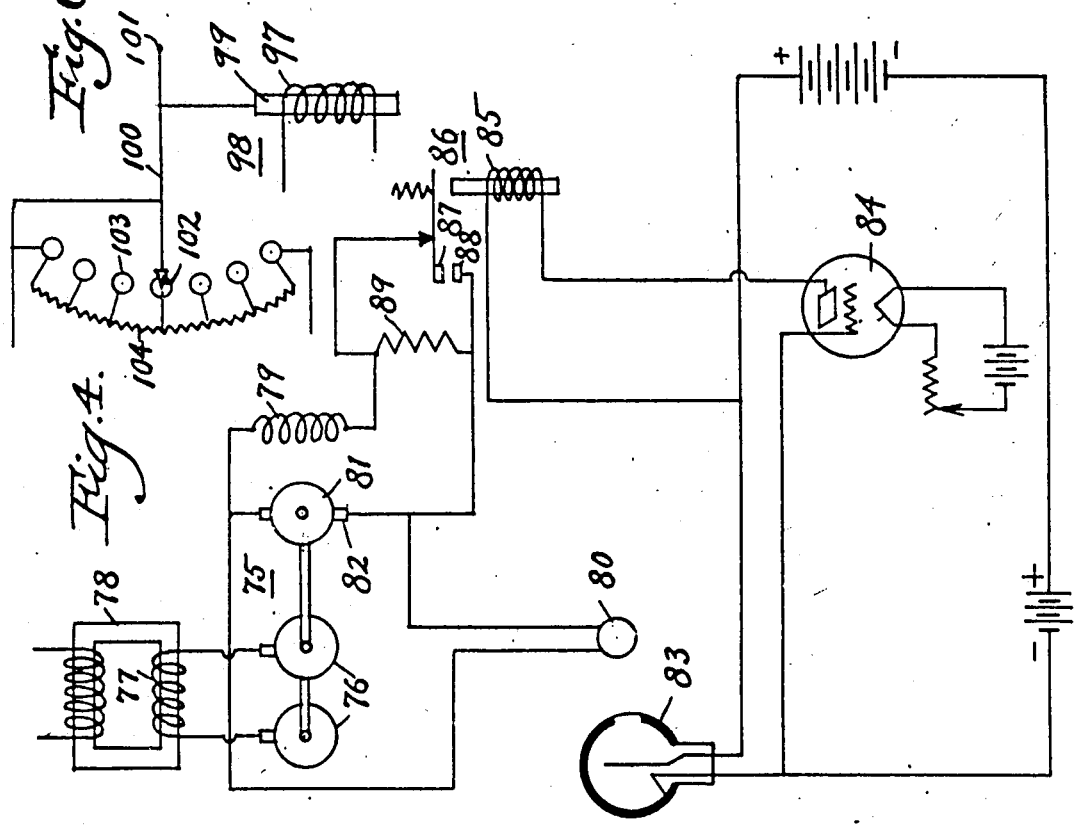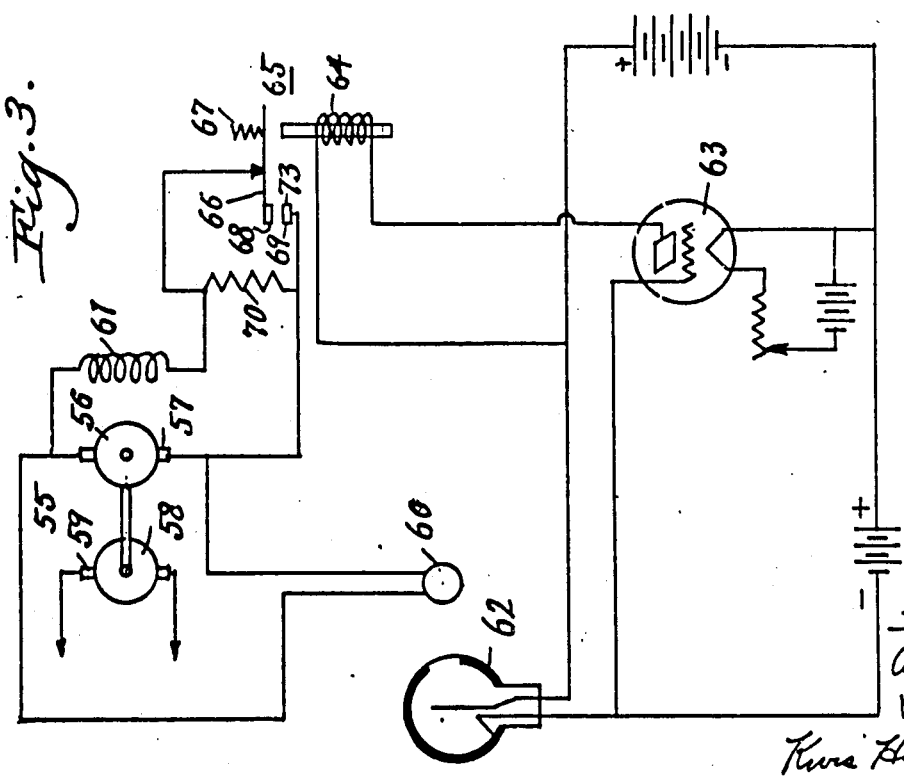

1,896,547

UNITED STATES PATENT OFFICE

BENNETT M. LEECE, OF CLEVELAND, AND DALE S. COLE, OF CLEVELAND HEIGHTS, OHIO, ASSIGNORS TO THE LEECE-NEVILLE COMPANY, OF CLEVELAND, OHIO, A CORPORATION OF OHIO

REGULATING MEANS

Application filed July 21, 1930. Serial No. 469,578.

This invention relates to regulators, and more particularly to novel means for regulating the voltage of generators which are operated under varying conditions of load and speed, such as generators which are driven by the prime movers of various kinds of motor vehicles.

An object of our invention is to provide a novel and extremely sensitive regulator which will maintain the voltage output of a generator at a more nearly constant value than has heretofore been possible.

Another object of our invention is to provide novel regulating means for variable speed generators in which the excitation of the generator field is controlled by the effect produced upon a light-sensitive surface by changes in the light intensity incident to fluctuations occurring in the generated voltage.

A further object of our invention is to provide voltage regulation for variable speed generators in which the excitation of the generator field is controlled by a photo-electric cell.

The invention may be further briefly summarized as consisting in certain novel combinations and arrangements of parts hereinafter described and particularly set out in the appended claims.

In the accompanying sheets of drawings,

Figure 1 is a diagrammatic view showing a generator system embodying the regulating means of our invention;

Fig. 2 is a diagrammatic view showing another generating system embodying our regulating means;

Fig. 3 is a diagrammatic view showing another generating system employing our regulating device;

Fig. 4 shows diagrammatically still another generating system using our regulating device;

Fig. 5 is a diagrammatic view showing a form of magnetically actuated resistance element which may be used to vary the field excitation in the generating systems employing our regulating device; and Fig. 6 is a diagrammatic view showing another form of magnetically actuated resistance element for varying the field excitation in generating systems employing our regulating means.

In applying our invention to the regulation of the voltages generated in various generating systems, we control the excitation of the generator field by the effect produced upon a light-sensitive or photo-active surface by changes in light intensity which are incident to fluctuations in the voltage generated. This light-sensitive surface is preferably an electrode of a photo-electric cell, while the source of the light which illuminates this photo-active electrode is a lamp which is connected to receive energy from the generator so that the intensity of the light emitted is dependent upon the voltage generated.

The generating systems illustrated diagrammatically in the drawings are particularly suitable for use on motor vehicles, but it should be understood that our regulating means is not limited to use with vehicular generating systems, but may be used for regulating generated voltages wherever extremely close and reliable regulation is desired.

In the system illustrated in Fig. 1, we have shown a generator 10 of the three-brush type having a commutator 11 from which current is delivered by the brushes 12 which cooperate therewith. The current delivered by the brushes may be used for charging the storage battery 13, for general lighting purposes, for heating the filaments of vacuum tubes, or for any other desired purpose. The generator is provided with a suitable field winding 14 having one terminal thereof connected to the third brush 15, and the other terminal thereof connected to the armature 16 of the electromagnet 17.

For varying the excitation of the generator field to thereby control the voltage generated, we provide a resistance 18 which is adapted to be alternately short-circuited and then connected in series with the field winding 14 and thus vary the ampere turns of the field winding. For altering the effect of the resistance 18 upon the field circuit, we connect the terminals of this resistance to the relatively movable contacts 19 and 20 of the electromagnet 17. The contact member 19 is mounted upon the movable armature which pivots upon the fulcrum 21, and is normally urged towards engagement with the stationary contact 20 by the action of the tension spring 22. The engagement of contact member 19 with contact member 20 short-circuits the resistance 18, and upon movement of the contact member 19 out of engagement with the contact member 20, the resistance 18 is connected in series with the field winding. For separating the contacts so as to decrease the field strength and thus bring about a decrease in the generated voltage, the electromagnet is provided with a suitable winding 23, which, when energized as a result of an increase in the generated voltage, moves the armature 16 against the action of the spring 22.

For controlling the supply of energizing current to the winding 23 of the electromagnet, we employ a thermionic valve 24 which amplifies the effect produced upon the photoelectric cell 25 by changes in the intensity of the light emitted by the lamp 26 which receives energy from the generator 10, so that, as the intensity of the light emitted by lamp 26 varies in response to changes in the generated voltage, corresponding fluctuations will occur in the current flowing through the coil 23 and cause the armature of the electromagnet to vibrate. The thermionic valve which we employ may be of any suitable design or construction, and in this instance we have shown a three-element vacuum tube having one terminal of the filament 27 thereof connected to the negative terminal of the battery 28, and having the plate 29 thereof connected to the positive terminal of the battery 28 through the coil 23, thus producing a circuit which includes filament 27, plate 29, coil 23 and battery 28. The filament may be heated by current supplied thereto by the battery 30, and the heating of the filament may be controlled by means of the variable resistance 31.

The heating of the filament of the vacuum tube causes electrons to pass from the filament to the positively charged plate 29, thus establishing a flow of current through the circuit which includes the coil 23 and the battery 28. For varying this flow of current through the vacuum tube in response to changes occurring in the voltage output of the generator, we connect the grid 32 of the vacuum tube with the electrode 33 of the photo-electric cell 25. This photo-electric cell may be of any suitable form of construction, such as that herein illustrated, in which the electrode 33 is formed of light-sensitive or photo-active material. This photo-active material forms the cathode of the cell, and should be arranged so that it can be illuminated by light admitted through the window portion 34 of the device. The plate 35 forms the anode of the photo-electric cell and is connected to the positive terminal of the battery 28 so that this plate is normally positively charged. A battery 36 is arranged with the negative terminal thereof connected to the photo-active electrode 33 of the photo-electric cell so that this electrode is normally charged negatively.

The lamp 26, which provides the source of light, is connected in circuit with the generator 10, preferably in parallel with the battery 13 so that fluctuations in the voltage generated produce corresponding fluctuations in the intensity of the light emitted by this lamp. The lamp is arranged opposite the window portion 34 of the photo-electric cell so that the light emitted by the lamp can pass through the window and illuminate the electrode 33.

The characteristics of the photo-active electrode 33 are such that, when this electrode is illuminated, negative electrons are given off and pass to the positively charged plate 35 at a rate which is substantially proportional to the intensity of the illumination. When the intensity of illumination increases, this flow of electrons away from the electrode 33 also increases and reduces its charge of negative electricity. The battery 36, however, tends to maintain the electrode 33 in a negatively charged state, and when the intensity of illumination decreases the flow of electrons also decreases and the battery restores the negative condition of the electrode. Changes in the intensity of illumination of the electrode 33 thus cause changes in its state of charge, and these changes are transmitted to the grid 32 of the vacuum tube and control the flow of current therethrough by their influence upon the flow of electrons from the filament 32 to the plate 29.

It will now be readily understood that as the terminal voltage of the generator increases the intensity of the light emitted by the lamp 26 is correspondingly increased, and, likewise, the intensity of illumination of the electrode 33 of the photo-electric cell is also increased. As a result of the increase in the intensity of illumination of this electrode, negative electrons leave the electrode at a more rapid rate and reduce its electrical charge or potential to a less negative state. This change in potential of the electrode 33 is transmitted to the grid 32 of the vacuum tube, and thus as the electrode 33 becomes less negative when exposed to the increased illumination from the lamp 26, the potential of the grid also becomes less negative. The reduction in the negative charge on the grid accelerates the flow of electrons from the heated filament 27 to the plate 29 and thus the flow of current through the winding 23 of the electromagnet is increased upon an increase in the terminal voltage of the generator. When the flow of current through the coil 23 has increased sufficiently, the armature 16 is attracted against the tension of the spring 22, thereby moving the contact 19 away from the contact 20 and placing the resistance 18 in series with the field winding 14. When the terminal voltage of the generator is low, the illumination produced by the lamp 26 is correspondingly low, and the negative potential of the electrode 33 and of the grid 32, having been restored by the battery 36, is correspondingly high. The effect of the high negative potential of the grid 32 is to retard the flow of electrons to the plate 29 and thus decrease the flow of current through the coil 23 of the electromagnet. The decreased flow of current through this coil permits the contact 19 to be moved into engagement with the contact 20 by the tension of the spring 22. The engagement of the contact 19 with the contact 20 short-circuits the resistance 18, thus increasing the ampere turns of the field winding 14 and the corresponding increase in the field excitation causes the terminal voltage of the generator to be increased. It will be understood, of course, that the fluctuations in the terminal voltage of the generator which we have described may take place at a very rapid rate so that the opening and closing of the contact 19 will be in the nature of vibratory movement.

While we have not mentioned any particular characteristics for the lamp 26, we contemplate using a lamp which will produce visible illumination. However, if desired, the sensitiveness of the regulator may be greatly increased by employing lamps which will emit light rays having other characteristics, such as ultra-violet or infra-red rays.

In Fig. 2 of the drawings we have shown, diagrammatically, a generating system which embodies the principle of our invention applied in substantially the same manner as already described in detail in connection with the system illustrated in Fig. 1. The system of Fig. 2, however, embodies an alternating current generator 40 having a suitable field winding 41 which is adapted to be energized by current supplied thereto from the brushes 42 of the exciter unit 43. The exciter is provided with a suitable field winding 44 having one terminal thereof connected to one of the brushes 42 while the other terminal is arranged for adjustable connection with the variable resistance 45.

The generator 40 is of the alternating current type and is provided with suitable slip rings 46 from which the output of the generator is delivered. A lamp 47, of suitable characteristics, is connected to the slip rings 46 so that the intensity of the illumination of the lamp will vary in response to changes in the terminal voltage of the generator. By means of a photo-electric cell 48, the variations in the intensity of the illumination emitted from the lamp 47 are impressed upon the thermionic valve 49 in such a way as to increase the flow of energizing current through the coil 50 of the electromagnet 51 upon an increase in generated voltage, and to decrease the flow of current through this winding upon a decrease in generated voltage. When the flow of current through the winding 50 has been increased sufficiently, the armature 52 of the electromagnet is attracted against the action of the tension spring 53 to move the contact 54 away from the contact 55 and thus place the resistance 45 in series with the field winding 44. Upon a decrease in the generated voltage the contacts 54 and 55 are closed by the spring 53 as a result of the flow of current through the winding 50 being decreased, thus short-circuiting the resistance 45 and increasing the excitation of the field 44, and in turn increasing the excitation of the field 41.

In Fig. 3 of the drawings, we have shown, diagrammatically, a generating system which is identical with that illustrated in Fig. 1 with the exception that the generator 55 employed in this system is a double voltage generator having a commutator 56 from which current is delivered through the brushes 57 at a low voltage which is suitable for battery charging, lighting purposes, and other uses, and a commutator 58 from which high voltage current is delivered through the brushes 59 for use in the transmission of radio signals and other purposes. In this system, a lamp 60, of suitable characteristics, is connected in circuit with the low voltage brushes 57 so that the intensity of the light emitted by this lamp will respond to changes in the terminal voltage of the generator. For regulating the voltage of the generator, the excitation of the field winding 61 is varied in response to the changes in the intensity of the light emitted by the lamp 60. For varying the excitation of the generator field, we employ the circuits and means which we have already described in detail in connection with Fig. 1, and which include a photo-electric cell 62 and a thermionic valve 63. The valve 63 controls the flow of energizing current supplied to the winding 64 of the electromagnet 65 in response to the effect produced upon the photo-electric cell by the changes in the intensity of the light emitted by the lamp 60. An increase in the supply of energizing current to winding 64 in response to an increase in the intensity of the light emitted by the lamp 60 moves the armature 66 against the tension of the spring 67, thereby moving the contact 68 out of engagement with the contact 69 and thus placing the resistance 70 in series with the field winding 61 to reduce the ampere turns of this winding. A decrease in generated voltage causes a decrease in the light emitted by the lamp 60 which results in a closing of the contacts 68 and 69 which short-circuit the resistance 70 and increases the excitation of the field 61.

In Fig. 4 of the drawings we have shown diagrammatically another generating system which embodies our regulating means and which is substantially identical with that illustrated in Fig. 3 except that one of the windings of the double voltage generator 75 is adapted to deliver single phase alternating current from the slip rings 76. The alternating current delivered by the generator may be used for any desired purpose, and, as herein illustrated, may be supplied to the primary winding 77 of the transformer 78.

For regulating the voltage of the generator the excitation of the field winding 79 is varied in response to the intensity of illumination emitted by the lamp 80 which is connected in circuit with the commutator 81 and brushes 82 associated with the direct current winding of the generator. The excitation of the field 79 is varied in response to the intensity of light emitted from the lamp 80 by the use of a photo-electric cell 83 and a thermionic valve 84 which control the supply of energizing current to the winding 85 of the electromagnet 86. The contacts 87 and 88 of the electromagnet are opened and closed in response to fluctuations occurring in the current supplied to the winding 85, and alternately connect the resistance 89 in series and then short-circuit it with respect to the field winding of the generator.

In Fig. 5 of the drawings we have shown a form of variable resistance which may be used in varying the excitation of the field winding of a generator to regulate the generated voltage. This resistance comprises a pile 90 composed of a series of movable contacts or conducting members 91. These contacts are held in assembled relation by the rod 92 which passes therethrough, and by movement of this rod the compression of the contacts is varied substantially in proportion to the force with which the pile is pressed against the spring 93. The pile is adapted to be connected in series with the field winding of the generator by means of the conductors 94 and 95 so that by variation of the compression of the contact members the resistance of the pile and of the field circuit is varied in a well known manner.

For varying the compression of the contact members of the pile, we utilize the rod 92 as a core for the electromagnet winding 96. When the flow of energizing current through the winding 96 is varied, as by means of the light responsive regulating means described in detail in connection with Fig. 1, the rod 92 is moved to compress or release the contact members of the pile and thus increase or decrease the excitation of the generator field.

In Fig. 6 of the drawings we have shown another form of variable resistance for use in controlling the field excitation and thereby regulating the voltage of a generator. In this arrangement changes in the flow of energizing current through the winding 97 of the electromagnet 98, produced by light responsive regulating means such as that disclosed in detail in connection with Fig. 1, cause the armature 99 to be moved relative to the winding. Movement of the armature 99 causes the arm 100 to be swung about its pivot 101 to move the contact member 102 with respect to the contacts 103, thereby increasing or decreasing the amount of the resistance 104 which is connected in the field circuit.

It will now be readily seen that the voltage of various generating systems, such as those which we have disclosed, may be regulated by varying the excitation of the generator field in response to fluctuations in the intensity of light produced by changes in the generated voltage. By the use of our regulating system, the voltage of various generating systems may be accurately and reliably regulated within remarkably close limits.

While we have illustrated and described our invention in a detailed manner, it should be understood, however, that we do not propose to limit ourselves to the precise details and arrangements shown and described, but regard our invention as including such changes and modifications as do not involve a departure from the spirit of the invention and the scope of the appended claims.

Having thus described our invention, we claim:

1. In apparatus of the character described, the combination with a generator having a field circuit, of a regulator comprising means for radiating light energy at an intensity which varies as the result of changes in the voltage generated, and means including a device having a light-sensitive electrode responsive to the intensity of the light energy radiated for varying the excitation of the generator field.

2. In apparatus of the character described, the combination with a generator having a field circuit, of a regulator comprising a lamp for emitting radiant energy at a variable rate which is dependent upon the voltage of the generator, and means including a photo-electric cell for varying the excitation of the generator field in response to changes in the emission of energy by said lamp.

3. In apparatus of the character described, the combination with a generator having a field circuit, of a regulator comprising a lamp lighted by said generator whereby fluctuations in the voltage generated produce corresponding fluctuations in the intensity of the light emitted by said lamp, and means including a photo-electric cell for varying the excitation of the generator field in response to variation in the intensity of the light emitted by said lamp.

4. The combination with a generator having a field circuit, of a resistance adapted to be connected into said field circuit, and regulating means for short-circuiting said resistance comprising movable contact means, a lamp responsive to the voltage generated, an electromagnet for actuating said contact means, and means including a photo-electric cell arranged to receive light from said lamp for controlling the supply of energizing current to said electromagnet.

5. The combination with a variable speed generator having a field winding, of a regulator for varying the ampere turns of the field winding comprising means for varying the resistance of the field circuit, an electromagnet for actuating said means, means for radiating energy at a rate which is dependent upon the voltage of the generator, and means influenced by the radiated energy for controlling the energization of said electromagnet.

6. The combination with a variable speed generator having a field circuit, of a regulator for varying the field excitation including movable contact means, an electromagnet for actuating said movable contact means, a lamp arranged to receive energy from said generator whereby fluctuations in the voltage generated produce corresponding fluctuations in the intensity of the light emitted by said lamp, thermionic valve means for varying the ampere turns of said electromagnet, and a photoelectric cell positioned to receive light from said lamp for controlling said thermionic valve means.

7. The combination with a variable speed generator having a field circuit, of a resistance adapted to be connected into said field circuit, and regulating means for short-circuiting said resistance comprising movable contact means, an electromagnet for actuating said movable contact means, a lamp arranged to receive energy from said generator whereby fluctuations in the voltage generated produce corresponding fluctuations in the intensity of the light emitted by said lamp, thermionic valve means for varying the ampere turns of said electromagnet, and a photo-electric cell positioned to receive light from said lamp for controlling said thermionic valve means.

8. The combination with a variable speed generator having a field circuit, of a regulator for varying the field excitation including movable contact means, an electromagnet for actuating said movable contact means, a lamp arranged to receive energy from said generator whereby fluctuations in the voltage generated produce corresponding fluctuations in the intensity of the light emitted by said lamp, thermionic valve means, and a photo-electric cell having a light-sensitive electrode connected to the grid element of said valve means whereby changes in the state of charge of said electrode produced by changes in the intensity of the light emitted by said lamp vary the ampere turns of said electromagnet.

9. The combination with a generator having a field winding, of a regulator for varying the ampere turns of the field winding comprising means for varying the resistance of the field circuit, an electromagnet for actuating said means, light emitting means arranged to receive energy from said generator whereby fluctuations in the voltage generated produce corresponding fluctuations in the intensity of the light emitted, thermionic valve means, and a photo-electric cell having a light sensitive electrode connected to the grid element of said valve means whereby changes in the state of charge of said electrode produced by changes in the intensity of the light emitted vary the ampere turns of said electromagnet.

10. The combination with a generator having a field winding, of light emitting means arranged to receive energy from said generator so that the intensity of light emitted varies substantially proportionately with the output of the generator, a photo-electric cell, and means for varying the excitation of the generator field including thermionic valve means for amplifying the effect produced upon said photo-electric cell by the changes in light intensity.

11. In combination, a generator, a regulator therefor, and means comprising a lamp operatively connected to the generator and a photo-electric cell arranged to receive energy from said lamp for varying the effects of the regulator.

In testimony whereof, we hereunto affix our signatures.

BENNETT M. LEECE.
DALE S. COLE.

DISCLAIMER 1,896,547.—*Bennett M. Leece*, Cleveland, and *Dale S. Cole*, Cleveland Heights, Ohio. REGULATING MEANS. Patent dated February 7, 1933. Disclaimer filed July 6, 1936, by the assignee, *Westinghouse Electric & Manufacturing Company*.

Hereby enters this disclaimer to claims 1, 4, 7, 10, and 11 of the specification.
[*Official Gazette August 25, 1936*]